United States Patent [19]

Kieldsen et al.

[11] 3,965,809

[45] June 29, 1976

[54] FRUIT PITTING APPARATUS

[76] Inventors: William E. Kieldsen, 2562 Borgum, NE., Grand Rapids, Mich. 49505; Raymond J. Mieras, 3702 Kalamazoo, SE., Grand Rapids, Mich. 49508

[22] Filed: July 18, 1974

[21] Appl. No.: 489,503

Related U.S. Application Data

[63] Continuation of Ser. No. 270,967, July 12, 1972, abandoned, which is a continuation-in-part of Ser. No. 121,031, March 4, 1971, abandoned.

[52] U.S. Cl. .................................. 99/492; 99/493; 99/561
[51] Int. Cl.² ..................... B23B 47/24; A23N 4/02
[58] Field of Search ..................... 99/492, 493, 561; 72/19, 21, 26

[56] References Cited
UNITED STATES PATENTS

| | | | |
|---|---|---|---|
| 1,785,013 | 12/1930 | Havens | 99/492 |
| 2,316,876 | 4/1943 | Lothes | 99/492 |
| 3,454,064 | 7/1969 | Weber et al. | 99/561 |

FOREIGN PATENTS OR APPLICATIONS

| | | | |
|---|---|---|---|
| 563,104 | 5/1957 | Italy | 72/19 |

*Primary Examiner*—Robert W. Jenkins
*Assistant Examiner*—James A. Niegowski

[57] ABSTRACT

This invention relates to a pitting needle and malfunction detector for use in automatic fruit pitting machinery. The needle has a bottom portion which is releasably fixed with respect to a holder. Movement of the bottom portion with respect to the holder as, for example, when a foreign object is struck, is sensed and, as a result thereof, an alarm is sensed and/or the machinery is stopped. In one embodiment, the needles are made in two parts and movement of one part with respect to the other is detected by a pressure sensor which is electrically connected to a power supply for the machinery to render it inoperative. In another embodiment, the needle is made in one part and the shank of the needle is releasably mounted in a holder bar which contains electrical, electro-mechanical, or pneumatic sensing means to detect movement of the needle with respect to the holder bar.

6 Claims, 12 Drawing Figures

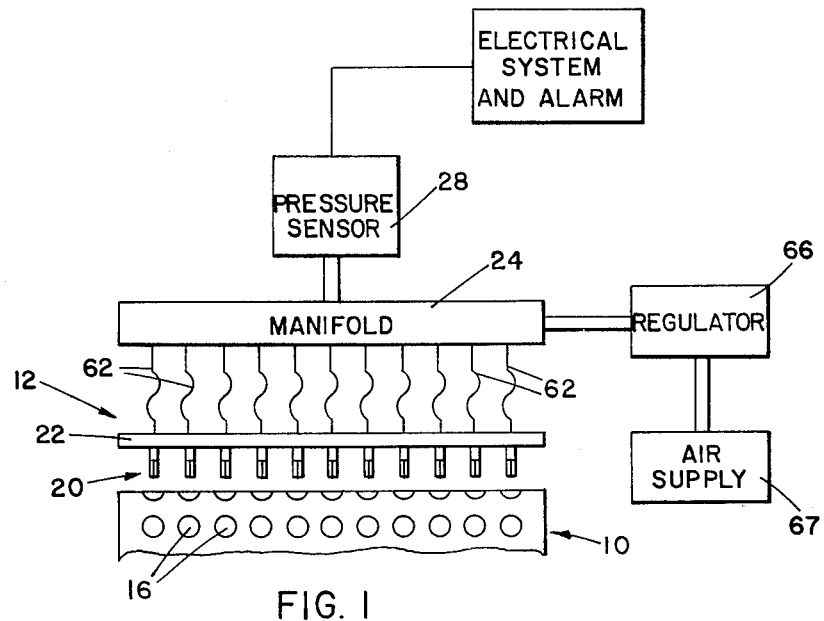
FIG. 1
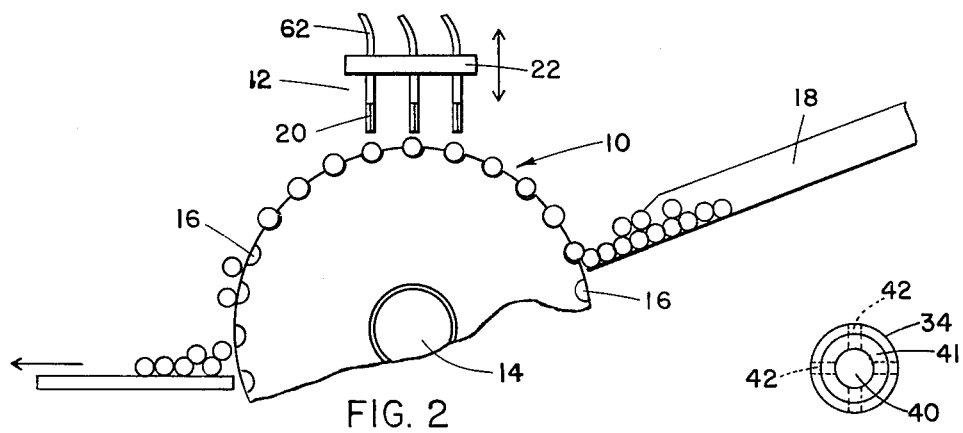
FIG. 2
FIG. 4
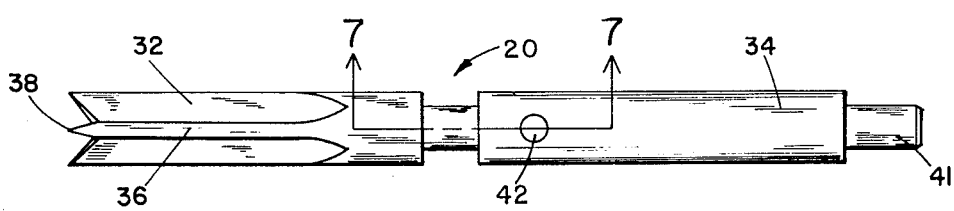
FIG. 3

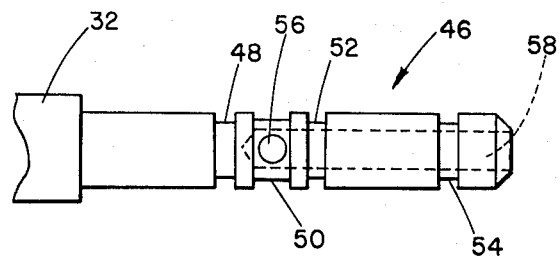
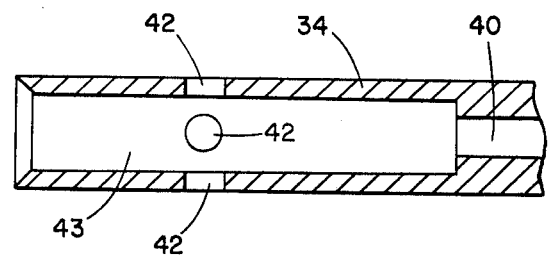
FIG. 5                FIG. 6
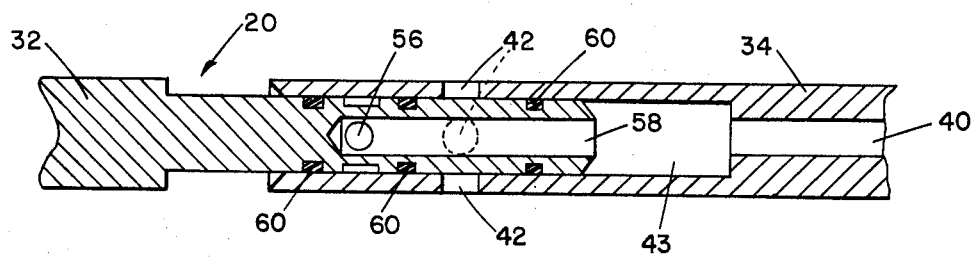
FIG. 7
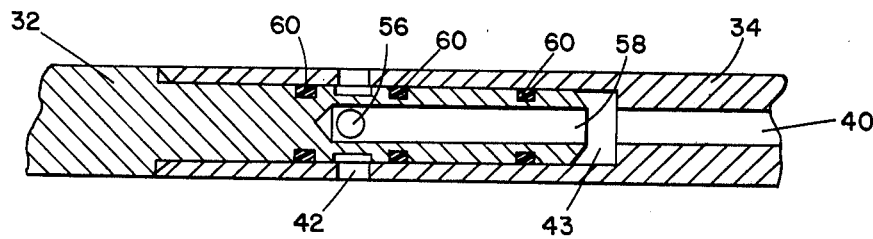
FIG. 8
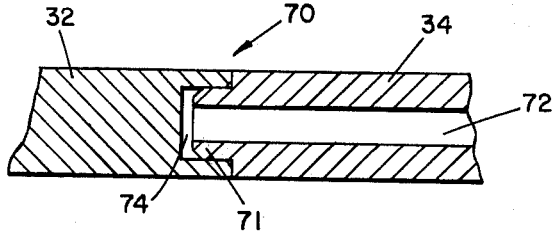
FIG. 9

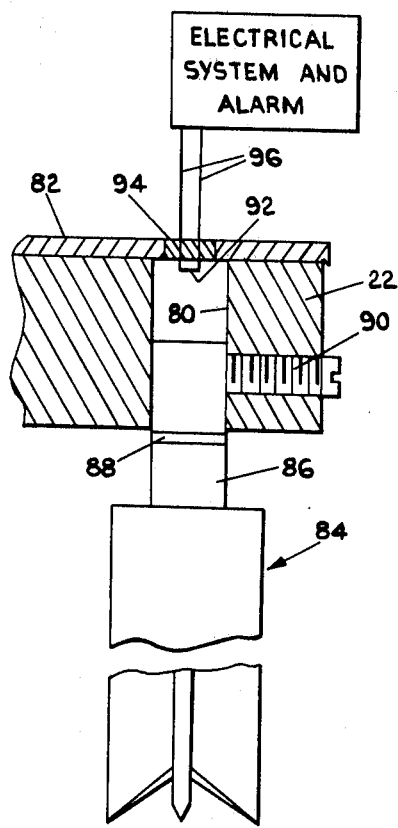
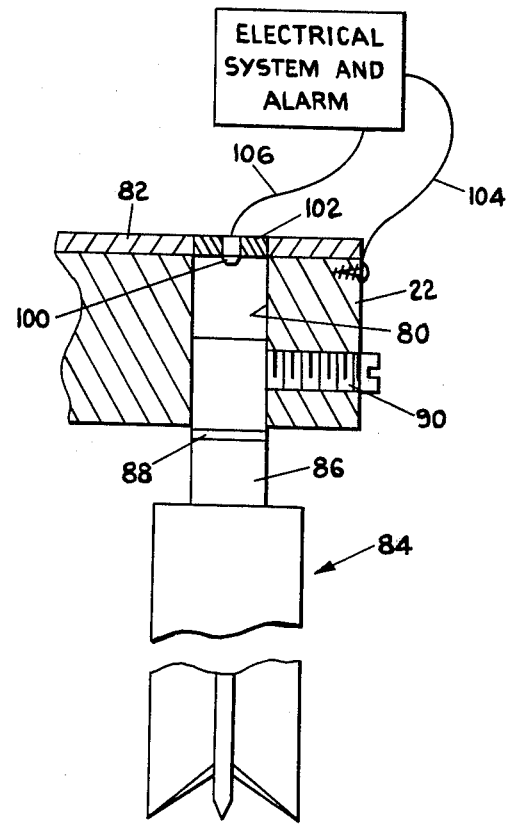
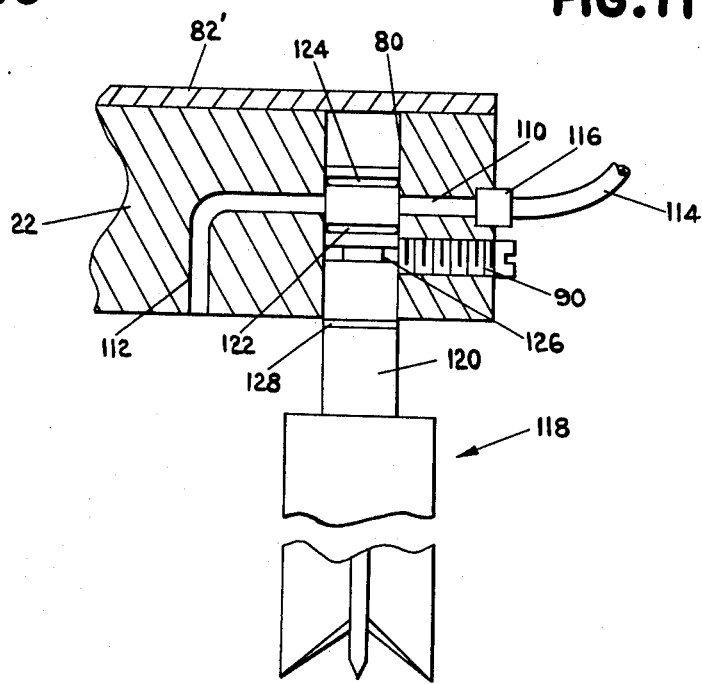
FIG. 10
FIG. 11
FIG. 12

FRUIT PITTING APPARATUS

CROSS-REFERENCE TO RELATED APPLICATIONS

This is a continuation of application Ser. No. 270,967, filed July 12, 1972, and which is a continuation in part of Ser. No. 121,031, filed Mar. 4, 1971, now abandoned.

BACKGROUND OF THE INVENTION

1. Field of the Invention

This invention relates to fruit pitting. In one of its aspects, the invention relates to a fruit pitting apparatus having pitting needles with means to detect malfunction or breakage of the pitting needles. In another of its aspects the invention relates to a pitting needle for use in automatic fruit pitting apparatus.

2. State of the Prior Art

In the automated pitting of fruit products such as cherries the fruit is transferred on a drum or conveyor beneath or adjacent a series of reciprocating needle-like projections. These projections move alternatively into and out of the fruit pushing the pit outwardly as the needle moves through the fruit.

One such pitting machine for processing cherries, comprises a large diameter, elongated hollow drum-like member having a series of cherry-receiving recesses about it periphery. Each recess has an aperture in its bottom portion, smaller in diameter than the fruit held therein, but slightly larger than the size of the pit. A plurality of needles aligned with the recesses in the drum are mounted for reciprocating movement and alternately move in and out of the recess, passing through the smaller hole located at the bottom. The drum rotates past a fruit supply hopper causing individual cherries to position themselves in the individual recesses. The drum is moved in a timed relationship to the reciprocating movement of the individual needles. As the drum stops, the needles are moved toward the drum and fruit with the individual needles passing through the fruit pushing the pit out of the fruit, through the hold in the bottom of the drum where they may be carried away in any convenient fashion.

During pitting operations, if a foreign object such as a stone should become mixed with the fruit in the hopper, it will eventually be carried in the drum recess and come in contact with the pitting needles. Naturally, the needle will break, bend, or otherwise become damaged. Such damage is not readily apparent in high speed production machinery and may therefore go undetected for long periods of time. Obviously, all fruit passing through a pitting operation with that needle will remain unpitted or improperly pitted until such time as the machine is shut down for inspection. Consequently, it is desirable to provide a means for detecting such breakage and to provide a signal or to render the machine inoperative immediately upon the occurrence of such breakage so that the needle may be replaced.

SUMMARY OF THE INVENTION

Briefly, then the invention provides an improved pitting needle and malfunction detection system for use in automated pitting machinery. The pitting needle has a bottom portion releasably secured to a holder. The bottom portion of the needle remains fixed with respect to the holder during normal operation of the machine but is movable with respect to the holder upon contact with a foreign object such as a rock. Means are provided to detect the movement of the needle bottom portion with respect to the holder. In one embodiment, the needle is fabricated from two sections: a hollow shank section and a pitting or tip section, the two sections being joined together at a reduced diameter junction. In normal operation, the needle is not completely pressed into the shank but is free to telescope into the shank when a foreign object is struck. As the needle telescopes into the shank, openings in the center diameter communicate with the hollow center portion, thereby exposing the interior to the atmosphere. This exposure may be sensed by a vacuum or pressure sensor, such sensing being utilized to render the machine inoperative or to otherwise provide a signal to the operator.

In another one of its embodiments, the pitting needle having two sections is pressed together at a reduced diameter junction. The shank portion is hollow and provides a port into the center of the junction of the two sections. When the pitting needle strikes an object, the needle portion will break away at the junction exposing the port to the atmosphere As in the first embodiment sensed changes in pressure may be utilized to render the machine inoperative.

In either of these two embodiments, the individual needles are connected to a manifold where fluid pressure is supplied to the hollow shanks of each needle. The pressure sensor is also connected to the manifold to monitor the pressure therein. This manifold pressure change is utilized to monitor the condition of the individual needles and upon the occurrence of a malfunction renders the machine inoperative through suitable conventional electronic circuitry operated by the pressure sensor.

In still another embodiment, the needle is made in one piece and is mounted in a holder in such a manner that the needle is permitted to move axially when a foreign object is struck by the needle tip. Electrical, electro-mechanical or pneumatic sensing means are provided in the holder to detect movement of the needle with respect to the holder.

OBJECTS

It is therefore a primary object of this invention to provide an improved automatic pitting machine for fruit products.

It is another object of this invention to provide an improved pitting needle assembly for automatic pitting machines.

It is yet another object of this invention to provide an improved pitting needle assembly which may easily be adapted for use in existing automatic pitting machinery.

It is still a further object of this invention to provide a means to sense automatically the malfunction of one or more of the pitting needles in a pitting machine.

It is still another object of this invention to provide, in a pitting machine, means to stop the operation of the machine upon the occurrence of malfunction of one or more of the needles.

BRIEF DESCRIPTION OF THE DRAWINGS

These and other objects of this invention will be readily understood by references to the following specification and accompanying drawings wherein:

FIG. 1 is a schematic view of portions of a pitting maching incorporating the invention;

FIG. 2 is a side view of a portion of the pitting machine shown in FIG. 1;

FIG. 3 is a side-elevational view of the pitting needle of the invention;

FIG. 4 is an end-elevational view of the pitting needle shown in FIG. 3;

FIG. 5 is a view of the junction end of tip portion of the pitting needle;

FIG. 6 is a cross-sectional view of the shank portion of the pitting needle;

FIG. 7 is a cross-sectional view taken along lines 7—7 of FIG. 3, showing the pitting needle in a pitting position;

FIG. 8 is a view similar to FIG. 7 showing the pitting needle in the configuration assumed when a foreign object has been struck;

FIG. 9 is a cross-sectional view showing the connection between the shank and tip portions of a second embodiment of the invention;

FIG. 10 is a fragmentary elevational view in section of a third embodiment of the invention;

FIG. 11 is a fragmentary elevational view in section of a fourth embodiment of the invention; and FIG. 12 is a fragmentary side elevational view in section of a fifth embodiment of the invention.

DESCRIPTION OF THE PREFERRED EMBODIMENTS

First Embodiment

The basic pitting apparatus is of conventional construction and its operation will be readily apparent to those skilled in the art. The construction and operation will, therefore, not be described in great detail other than to set the environment for the invention.

Referring now to the figures and particularly to FIGS. 1 and 2, the conventional pitting assembly comprises two basic parts, a rotary mounted drum assembly 10 and a needle carrying or punch assembly 12. The drum assembly 10 is rotatably mounted on a shaft 14 and has on its outer periphery a plurality of recesses 16. As the drum passes along a fruit supply hopper 18, the individual fruits fall into the recesses and are carried upwardly on the drum below the punch assembly. Each recess has a small hole in its lower portion opening into the inside of the drum where the fruit pit is forced during pitting operations.

The punch assembly 12 is mounted in a conventional fashion for reciprocal movement toward and away from the drum and has a plate portion 22 adapted to carry a plurality of pitting needles 20. One needle is provided for each recess 16 in an individual row of recesses in the drum 10. As shown in FIG. 2, several rows of fruit carrying recesses and needles 20 may be aligned at one time.

When the fruit carrying recesses are aligned with a row of needles 20, the drum stops its rotation, and the punch assembly is automatically actuated in a conventional manner. The individual needles pass through the fruit pushing the pit out of the fruit through the hole in the bottom of the recess and into the drum where it may be disposed in a conventional manner.

Occasionally, a stone or other foreign object will position itself in a recess and the needle while being forced therein will bend or break. The improvements of this invention, also shown in schematic form in FIGS. 1 and 2, comprise an improved pitting needle 20 to be described more fully hereinafter, a manifold assembly 24, a regulated fluid pressure supply 66, and a pressure sensor 28.

Referring specifically to FIGS. 3 through 8, the improved pitting needle 20 of the invention comprises two basic parts, the tip or pitting section 32 and the shank or mounting section 34. The pitting tip 32 is of a conventional configuration having fluted portions 36 extending to a plurality of chisel-like, sharpened ends 38 which are provided for cutting through the fruit and pushing the pit therethrough.

The shank section 34 is circular and has a fluid passageway 40 passing through its entire length. A plurality of radial outlet ports 42 are provided transverse to the length of the shank and are spaced approximately 90° to each other around the outer diameter. The outlet ports 42 communicate with the passageway 40 passing through the shank. The passageway 40, through at least a portion of its length 43 (FIG. 6) is machined for a pressed fit with the needle section.

FIG. 5 is a view of the end of the pitting tip 32 opposite the sharpened chisel ends 38. The end 46 is machined to have an outer diameter corresponding closely to the inner diameter 43 of the shank section for a pressed fit therewith. A series of radial grooves 48, 50, 52 and 54 are formed around the outer diameter. A radial outlet port 56 is provided through the wider groove 50 which communicate with an axially extending passageway 58 in the machined end 46 of the tip. Passageway 58, as illustrated, extends to and opens at the flute-removed extremity of tip 32.

FIG. 7 shows the two sections of the needle assembly pressed together in the normal pitting position. As shown, the machined end 46 of the tip 32 is pressed fit into the machined opening 43 in the hollow shank sections 34. Alternately, the sections may be staked together in either assembly. A series of O rings 60 are provided in the radial grooves 48, 52, and 54 to provide a tight seal between the two sections. It should be noted that in this position, the outlet ports 56 and 42 in the tip 32 and shank 34, respectively are isolated from each other by the O rings.

If during the pitting operations, the needle tip section should strike a foreign object, the press fit is such that the tip 32 will telescope into the shank section as shown in FIG. 8. Upon such occurrence, the outlet ports 42 and 56 will become axially aligned through groove 50. A pressure source applied to the end of the shank section at the necked down section 41 will be released through passageways 40, 43, 58, and finally through the aligned outlet ports 42 and 56 to the atmosphere.

Referring again to FIG. 1, each needle is shown connected by flexible tubing 62 to a manifold assembly 24 which may be mounted on or adjacent the plate 22 of the pitting machine. A source of pressure from an air supply 67 is connected through a regulator 66 to the manifold 24 where it is applied to each individual pitting needle assembly through the flexible tubing 62. The regulated pressure source is ideally maintained at approximately 20 psi.

A pressure sensing switch 28 is connected to the approximaate center of the mainfold 24 and serves to sense the presence or absence of pressure therein. The switch is of a conventional mechanical type having electrical contacts therein which, in the absence of pressure are opened, and in the presence of pressure are held in a closed position. The switch may be connected in series with the electrical system for the pitting machine or alternately may be used to activate a relay suitably connected in the electrical system. The range of actuation may be adjusted, and it has been found most desirable to have the switch open when the pressure differential in the manifold changes approximately 0.6 psi.

When a needle breaks or if the outlet ports become aligned due to the presence of a foreign object in the recesses 16 of the drum 10, the pressure in the manifold drops extremely rapidly and as described above, the machine is rendered inoperative or an alarm is sounded. The operator may quickly glance at the needles and replace the collapsed or broken one eliminating any chance that some fruit will be passed unpitted.

Second Embodiment

A second embodiment of a pitting needle is illustrated in cross section in FIG. 9. The pitting tip section 32 and the shank section 34 are the same as that illustrated in connection with the first embodiment except insofar as the mode of connection of the two sections is concerned.

In this second embodiment, the two sections are pressed together at a reduced diameter junction 70. The shank section 34 is hollow and is machined to form a reduced diameter section 71 at the end thereof. The reduced diameter junction provides a weakened portion of the needle assembly. Consequently, if the needle strikes a non-yielding object, breakage will occur at the junction. The hollow center provides a port 72 into the center of the junction.

The tip section 32 is provided with an opening 74 adapted to receive the reduced diameter shank in a press fit. When the pitting needle strikes an object, the needle will break away at this reduced diameter junction 70, thereby exposing the port 72 in the shank section 34 to the atmosphere. As in the first embodiment this exposure may be detected by the pressure sensor through the manifold and utilized in a circuit to render the machine inoperative.

Third Embodiment

Reference is now made to FIG. 10 which illustrates a third embodiment of the invention. A plate portion 22 which is mounted for reciprocal movement by the pitting machine, has a plurality of vertical bores 80, only one of which is shown in FIG. 10 for purposes of simplicity. Each bore 80 releasably retains a pitting needle 84 having an upper shank 86 which fits into the bore 80. A marking 88 can be provided on the shank 86 as an indication of the depth to which the shank is positioned within the bore 80. The needle 84 is otherwise of conventional size and shape having the conventional sharpend ends at the bottoms thereof. A set screw 90 is provided in a lateral threaded bore in the plate 22 in adjusted position to secure the shank 86 in the bore 80 with a predetermined force. A top plate 82 is mounted securely on the plate portion 22 through suitable means such as screws (not shown) and mounts a plug 94 at the top end of the bore 80. A piezoelectric crystal 95 or other suitable pressure sensitive electrical means is mounted on the plug 94 and is coupled to an electrical system through leads 96. The electrical system can contain a relay, for example, operated by the flow of current through the crystal 95. In the event of a given current flow through the crystal 92, the relay can be actuated to shut down the machine and/or activate an audible alarm.

In normal operation, the pitting needle is retained in the position illustrated in FIG. 10. If the pitting needle strikes a stone or other foreign object, the needle will be driven up against the piezoelectric crystal 92. This pressure of the top of the shank 86 against the piezoelectric crystal will be sensed by the electrical system and responsive thereto the pitting machine will be stopped. In addition an alarm may be sounded responsive thereto. The electrical system can be any conventional system which electrically senses the pressure against the piezoelectric crystal 92 and, in the event that the pressure against the crystal 92 is increased, to shut down the machine and/or to generate an alarm signal responsive thereto.

Fourth Embodiment

Reference is now made to FIG. 11 which illustrates a fourth embodiment of the invention. In this figure like numerals have been used to designate like parts.

A plate portion 22 has a bore 80 for receiving the shank 86 of a pitting needle 84. Markings 88 on the shank 86 can be provided to illustrate the depth to which the shank is inserted into the bore 80. A set screw 90 is provided in a threaded bore of the plate portion 22 to retail the shank 96 in the bore 80 with a predetermined force. A top plate 82 mounts an insulated plug 102 having a central contact member 100 projecting into the bore 80. The contact member 100 is insulated from the top plate 82 by the insulated plug 102. A lead 106 connects the contact member 100 with an electrical system having an alarm associated therewith. A second lead 104 is connected to the plate portion 22. The leads 104, 106 can be coupled to a relay (not shown) or other suitable current sensing means to shut down the machine when current flows through leads 104 and 106.

In operation of the fourth embodiment illustrated in FIG. 11, the needle is reciprocated by the plate portion 22 with the needle normally assuming the position shown in FIG. 11 with the set screw 90 retaining the shank 86 and the bore 80 with a predetermined force. An electrical potential is applied between leads 104 and 106. The electrical system is provided with means for detecting a current flow between leads 104 and 106. In the event that the pitting needle strikes a stone or other foreign object, the needle 84 will be driven upwardly with the shank 86 moving up to contact the contact member 100, thereby completing the circuit between lead 104 and contact member 100. The electrical system thereafter senses the flow of current through the circuit thus created and, responsive thereto, shuts down the machine and/or sounds an alarm signal.

Fifth Embodiment

Reference is now made to FIG. 12 for a fifth embodiment of the invention, in which figure like numerals are used to designate like parts. A plate portion 22 has a bore 80 which mounts the shaft 120 of a pitting needle 118. A set screw 90 is provided in a threaded bore in plate portion 22 to retain the shank 120 within the bore 80 with a predetermined force. A top plate 82' is secured to the plate portion 82 and closes off the top end of the bore 80 thus providing a stop. The plate portion 22 has a pressure bore 110 extending from an edge of the plate portion into the bore 80. A vent bore 112 is provided diametrically opposite the bore 110 and provides a vent to the atmosphere for the bore 80. A fluid pressure line 114, connected to a source of fluid pressure, (not shown) is connected to the pressure bore 110 through a coupling member 116.

The pitting needle 118 has a conventional bottom portion with sharpened ends. The shank 120 can contain markings 128 at a bottom portion to indicate the depth to which the shank 120 is inserted into the bore 80. The shank contains a pair of O ring seals 122 and 124 which are normally positioned at either axial end of the pressure bore 110 and the vent bore 112. A circular groove 126 is provide beneath the O ring seal 122 for communication with the pressure bore 110 and the vent bore 112 in the event that the pitting needle 118 is moved upwardly within the bore 80 to the point where the top of the shank 120 contacts the top plate 82.

In operation of the embodiment illustrated in FIG. 12, the pitting needle is secured into the bore 80 of the plate portion 22 with the set screw 90 retaining the shank 120 therein with a predetermined force. If the pitting needle strikes a stone or other foreign object, the needle will be driven upwardly with the top portion of the shank 120 coming to rest against the top plate 82'. In this position, the circular groove 126 will be positioned adjacent to the pressure bore 110 so that the pressure therein is vented around the circular groove 126 and through the vent bore 112. The pitting apparatus is provided with a manifold, pressure sensor and electrical system and alarm in the same fashion as is provided for the first and second embodiment and illustrated in FIG. 1 above. Upon movement of the pitting needle to vent the pressure in pressure bore 110, the pressure sensor will detect a drop in the pressure and will accordingly signal an electrical system to shut down the machine and/or set off an audible alarm.

It may, therefore, be readily appreciated that this invention provides a novel pitting needle and malfunction detector for use with automated pitting machinery. The invention is relatively simple in construction, inexpensive, and is readily adapted for use with existing pitting machines.

While the preferred embodiment of this invention has been illustrated in detail, it will be apparent to those skilled in the art that many modifications thereof may be made without departing from the concepts disclosed herein. Such modifications are to be considered as included in the following claims unless these claims by their language expressly state otherwise.

The embodiments of the invention in which an exclusive property or privilege is claimed are defined as follows:

1. A pitting apparatus comprising:
    a two-section pitting needle having a tip section and a shank section, said sections being joined together at a junction, said shank section having a fluid passageway therein communicating with the junction of said sections;
    said tip section and said shank section being telescopically joined together at said junction, said sections having fluid pressure inlet and outlet ports therein, said sections when in a first position isolating said inlet port from said outlet port and when in a second position providing an open fluid passageway between said inlet and said outlet ports;
    a fluid pressure source connected to said passageway in said shank sections;
    the fluid pressure within said passageway changing upon the occurrence of relative movement of said sections between said first and second positions at said junction; and
    means for sensing such changes.

2. A pitting apparatus as claimed in claim 1 and further including means for reciprocally moving said needle and means associated with said sensing means to render said reciprocal moving means inoperative upon the occurrence of changes in said fluid pressure.

3. A pitting apparatus comprising:
    a two-section pitting needle having a tip section and a shank section, said sections being joined together at a junction, said shank section having a fluid passageway therein communicating with the junction of said sections;
    means for joining said sections together in such a manner that said sections are fixed with respect to each other until a predetermined force is applied thereto whereupon a relative movement between said sections takes place, said joining means holding said sections in displaced condition following withdrawal of said force;
    said tip section having a fluid passageway extending through at least a portion of its length and communicating with said passageway in said shank, said tip section and said shank section having radial openings therein communicating with said passageways, said sections when in a first position relative to one another maintaining said radial openings in said shank and tip sections in non-communicating relationship and when in a second position providing a path for fluid communication between said radial openings in said shank and tip sections;
    a fluid pressure source connected to said passageway in said shank section;
    means for causing changes in the fluid pressure within said passageway upon the occurrence of relative movement of said sections at said junction; and
    means for sensing such changes.

4. A pitting apparatus as claimed in claim 3 and further including means for reciprocally moving needle and means associated with said sending means to render said reciprocal moving means inoperative upon the occurrence of changes in said fluid pressure.

5. A pitting apparatus comprising:
    a two-section pitting needle having a tip section and a shank section, said sections being joined together at a junction, said shank section having a fluid passageway therein communicating with the junction of said sections;
    means for joining said sections together in such a manner that said sections are fixed with respect to each other until a predetermined force is applied thereto whereupon a relative movement between said sections takes place, said joining means holding said sections in displaced condition following withdrawal of said force;
    said joining means including one of said tip and shank sections having a male portion; the other such section having a female portion; said portions being adapted to fit telescopically together to form said junction;
    a radial air passageway in said female portion, and a radial air passageway in said male portion, said passageways being in communication with one another when said sections are in a collapsed position with respect to one another, said passageways being in a non-communicating relationship with respect to one another when said sections are in a non-collapsed position with respect to one another;

a fluid pressure source connected to said passageway in said shank section;

means for causing changes in the fluid pressure within said passageway upon the occurrence of relative movement of said sections a said junction; and means for sensing such changes.

6. A pitting apparatus as set forth in claim 5 which further comprises peripheral seal means surrounding said male portion.

* * * * *